US006743493B2

(12) United States Patent
Crum et al.

(10) Patent No.: US 6,743,493 B2
(45) Date of Patent: Jun. 1, 2004

(54) COMPOSITE FORM WITH IMPRINTABLE MAGNETIC CARD

(75) Inventors: Jesse Crum, Fort Scott, KS (US); Merl Mercer, Fort Scott, KS (US); Kevin Marquardt, Fort Scott, KS (US)

(73) Assignee: Ward-Kraft, Inc., Fort Scott, KS (US)

( * ) Notice: Subject to any disclaimer, the term of this patent is extended or adjusted under 35 U.S.C. 154(b) by 0 days.

(21) Appl. No.: 09/953,011

(22) Filed: Sep. 11, 2001

(65) Prior Publication Data

US 2003/0049403 A1 Mar. 13, 2003

(51) Int. Cl.[7] .......................... A45F 5/00; B32B 33/00; B32B 9/00; B65D 23/12

(52) U.S. Cl. .................... 428/42.2; 428/40.1; 428/42.3; 428/57; 428/60; 428/192; 428/133; 428/131; 283/81; 283/98; 283/101; 283/82; 224/183; 206/460; 206/489; 206/733; 206/734

(58) Field of Search ........................ 428/40, 40.1, 42.2, 428/42.3, 60, 192, 131–134, 44, 53, 57, 43, 928; 283/98, 82, 101; 206/733–734, 460, 489, 525, 779; 224/183; 462/6; 40/124.04, 124.06

(56) References Cited

U.S. PATENT DOCUMENTS 5,403,236 A 4/1995 Greig ............................ 462/6
5,676,307 A * 10/1997 Martin ...................... 229/92.8
5,756,175 A * 5/1998 Washburn .................. 428/42.3
5,993,928 A * 11/1999 Popat .......................... 428/43
6,153,280 A * 11/2000 Uffmann ...................... 428/43
6,173,888 B1 * 1/2001 Fabel .......................... 229/71
6,340,512 B1 * 1/2002 Mercer et al. ............. 428/42.2

FOREIGN PATENT DOCUMENTS

GB 2 292 474 * 2/1996

OTHER PUBLICATIONS

Magnetic Specialty Inc. TechData Sheet for ProMAG Magnetic Sheet, reprinted Feb. 18, 2003 from http://www.magneticspecialty.com/mag_prod_sheet.htm.*

Magna Tel Line Product Catalog, 2000.*

Copies of Magna Tel Line catalog, Year 2000.

* cited by examiner

*Primary Examiner*—Harold Pyon
*Assistant Examiner*—Brian P. Egan
(74) *Attorney, Agent, or Firm*—Hovey Williams LLP

(57) ABSTRACT

The present invention relates to a composite form and a method of printing the form. The composite form has a paper component and a flexible magnetic sheet component that are adhered to one another. The magnetic component is able to adhere to a ferromagnetic surface but does not adhere to other composite forms having a magnetic component through use of a shielding layer when the forms are provided in a stacked configuration for feeding into a printer. The composite form may be fed through a printer without jamming or magnetic attraction to components within the printer. The composite form is constructed to facilitate printing by having a single thickness entering the printer with a small area of overlap between the paper component and magnetic sheet component or the magnetic component may be inlaid into an opening in the paper component.

25 Claims, 5 Drawing Sheets

COMPOSITE FORM WITH IMPRINTABLE MAGNETIC CARD

BACKGROUND OF THE INVENTION

1. Field of the Invention

This invention concerns a composite form including a carrier component of paper or other nor-magnetic material and a magnetic component connected thereto whereby the magnetic component and the carrier component may be initially and subsequently imprinted individually and sequentially in automated feeding without carrying additional forms stacked-thereon, into the infeed site of the printer. The magnetic component includes a card portion which is separable from the carrier component for further use.

2. Description of the Prior Art

Flexible magnetic material has been available for a variety of uses, and provides a convenient way to display information or attach papers to surfaces such as iron, steel, nickel or the like and,capable of magnetic connection. Such uses have included business cards and "refrigerator magnets" where the flexible magnetic material has been capable of holding paper to a steel surface. Further, paper overlays have been adhesively attached to flexible magnetic backings to provide calendars or perforated redeemable coupons.

These uses of flexible magnetic material have met with certain limitations. While generally capable of imprinting by itself, the flexible magnetic material has not been provided in such a way as to provide for imprinting as an integrated component of a composite element or form. Thus, when paper overlays or the like have been provided with the flexible magnetic material, they have been separately printed and then attached. Moreover, magnetic attraction between the cards and the steel components of printing presses causes the magnetic cards to interfere with the feeding and printing processes of ordinary desktop printers like laser jet printers and ink jet printers.

SUMMARY OF THE INVENTION

The present invention provides improved capabilities for the use of magnetic cards by the incorporation of the magnetic card into a composite business form. This not only increases the convenience of distribution of the cards, but permits complemental printing on the magnetic cards and a carrier component of a non-magnetic material with specific information for the recepient when the form is printed. By facilitating the customization of the magnetic card, incorporation of the card into a business form, and securing the magnetic material to a carrier component of the business form, the objects of achieving a high rate of printing, customized printing by the user of both the carrier component and the flexible magnetic component, and convenience to the end user are achieved. No longer need the magnetic component be separately imprinted from the non-magnetic carrier component, both when initial printing is done at the time of manufacturing and when recipient-specific information is printed on each form.

Broadly speaking, the present invention provides a composite form which includes a sheet of non-magnetic material such as plastic, cardboard, paper or the like to provide a carrier component and magnetic component of a normally thicker sheet of magnetic material which is connected to the carrier component. All or a part of the magnetic component may be provided as a card or other component which may be separated from the form along a separation line, which as used herein includes die cuts, perforation lines and score lines. Preferably, the magnetic material is positioned and connected so that at least one edge or side, or alternatively all of the edges of the magnetic material have the carrier component extending therefrom. In some of the embodiments hereof, the magnetic component is inlaid into and thus surrounded by the carrier component, whereby no edges of the magnetic material are exposed beyond the margins of the paper component. The carrier component may include multiple sheets of paper, film or metallic foil in overlying relationship to provide labels or carbonless transfer components to provide multiple plies, or may be of a single thickness. The magnetic material may include lines of weakness such as score lines or perforations, or lines of separation to separate the magnetic material into subparts which may be separated from one another. Because the magnetic component normally has a greater thickness than the carrier component, the attachment therebetween may include not only joining the sheets by overlapping, but also beveling or skiving the magnetic component along the margin adjacent to the carrier component to facilitate feeding the form through a printer for providing customized indicia thereon. In addition, the magnetic component may be positioned within the margins of the carrier component so that it is in an inlaid orientation with respect to the carrier component.

As a result, the composite form hereof is provided in an extremely useful configuration for business applications. The composite form may be used as a business form for custom imprinting on a printer, such as a laser or ink jet printer to which printing, colors or designs may be printed on the form to customize its use for different recipients. The placement and manner of attachment of the magnetic sheet to the business form greatly facilitates the subsequent printing of both the carrier component and the magnetic component. Especially beneficial is the arrangement and construction of the magnetic material, and its magnetic configuration, which retains the ability of the magnetic material to be retained on a ferromagnetic surface such as iron, nickel or cobalt, without improperly carrying of more than one form at a time into the infeed site of the printer. Moreover, the magnetic component may be configured for separation into subcomponents for alternative uses, such as a support for a calendar and a separate magnetic card by the provision of selective lines of weakening. Finally, the carrier component may be imprinted for use as an invoice or the like, or provided with labels with pressure sensitive adhesive whereby alternate labels may be placed on the magnetic component, thereby providing a form which has its carrier component complemental to the magnetic component.

These and other advantages of the present invention will be readily apparent to those skilled in the art with reference to the drawings and description which follow.

DESCRIPTION OF THE PREFERRED EMBODIMENT

Figure 1:
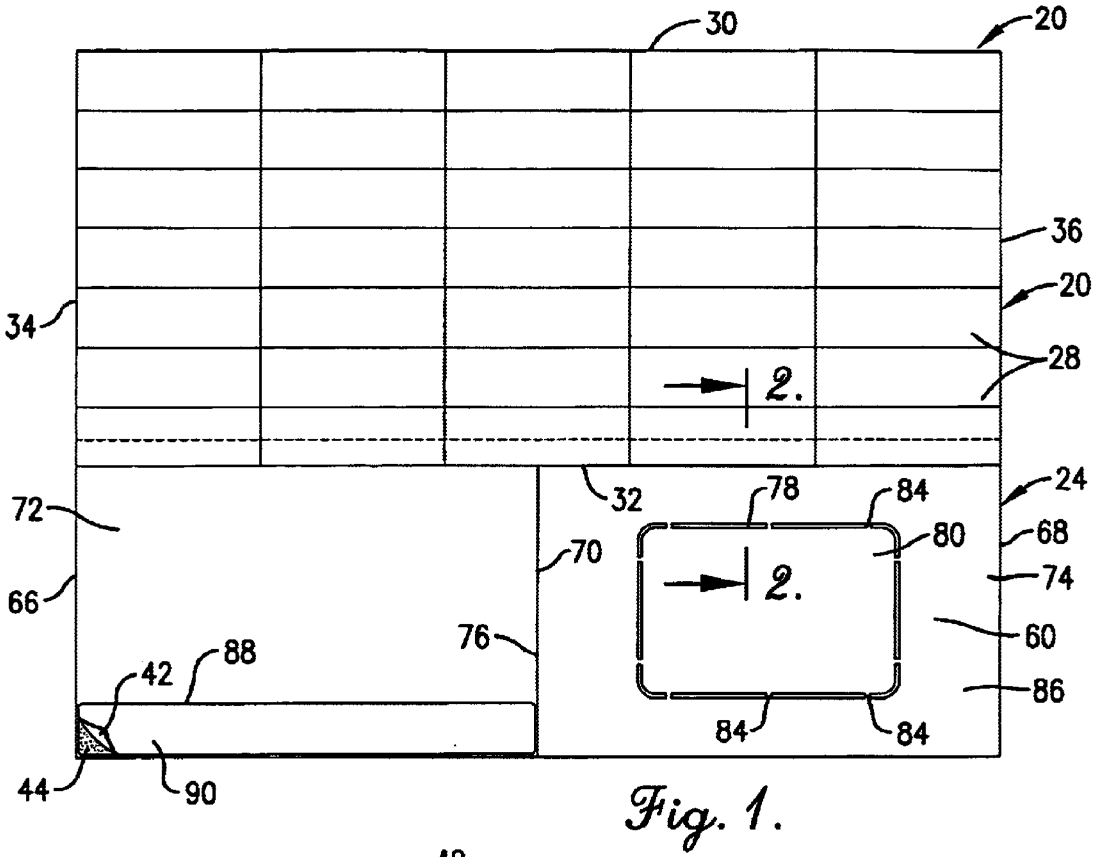
FIG. 1 is a front elevational view of a composite form in accordance with the present invention showing a carrier component of paper or the like and a magnetic component, the magnetic component including a first segment with an adhesive strip and covering strip and a second segment with a detachable rectangular card portion.

Referring now to the drawings, a composite form 20 in accordance with the present invention is shown in FIGS. 1–5 and broadly includes a carrier component 22 connected to a magnetic sheet component 24. The carrier component 22 is non-ferromagnetic and may be a single sheet 26 of cardboard, paper, synthetic resin film, or foil of a non-magnetic material or may be provided to include additional plies such as labels 28 having an adhesive backing such as pressure sensitive adhesive with corresponding opposed portions of sheet 26 having a silicone release coating, carbonless transfer paper sheets, or plain paper sheets.

Figure 2:
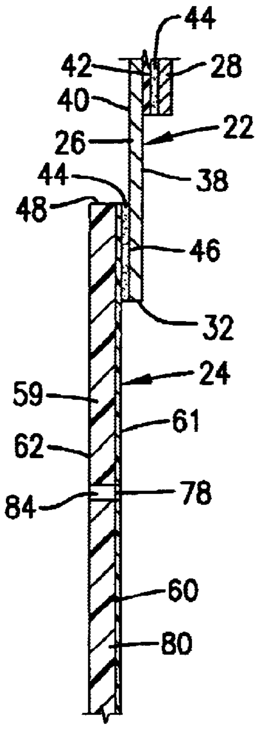
FIG. 2 is an enlarged, fragmentary vertical cross-sectional view taken along line 2—2 of FIG. 1 showing a first alternative connection between the carrier component and the magnetic component with the carrier component overlapping the magnetic component and joined by adhesive, the line of weakness for separating the card from the surrounding magnetic material being provided by perforations.
Figure 3:
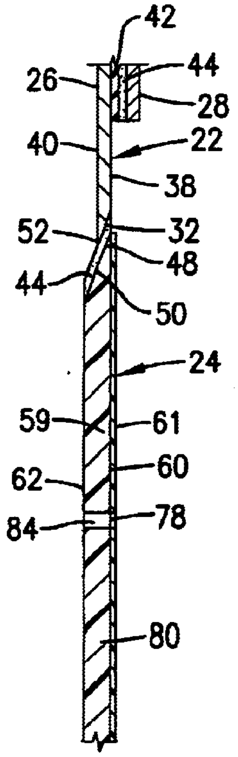
FIG. 3 is an enlarged, fragmentary vertical cross-sectional view taken along line 2—2 of FIG. 1 and similar to FIG. 2, showing a second alternative attachment of the carrier component and the magnetic component of the form of FIG. 1 wherein the magnetic component and the carrier component are beveled along their adjacent margins and joined together by adhesive, the line of weakness for separating the card from the surrounding magnetic material being provided by perforations.
Figure 4:
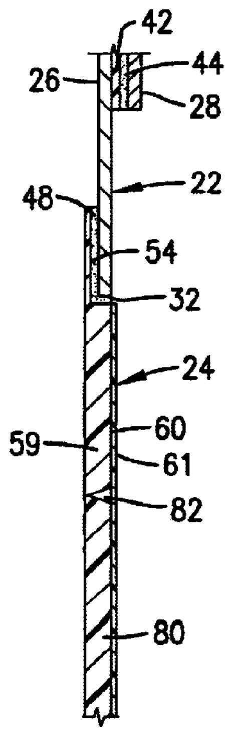
FIG. 4 is an enlarged, fragmentary vertical cross-sectional view taken along line 2—2 of FIG. 1 and similar to FIG. 2, showing a third alternative attachment of the carrier component and the magnetic component of the form of FIG. 1, showing skiving of the magnetic component to receive the carrier component along their adjacent margins and joined together by adhesive, the line of weakness for separating the card from the surrounding magnetic material being provided by a score line.
Figure 5:
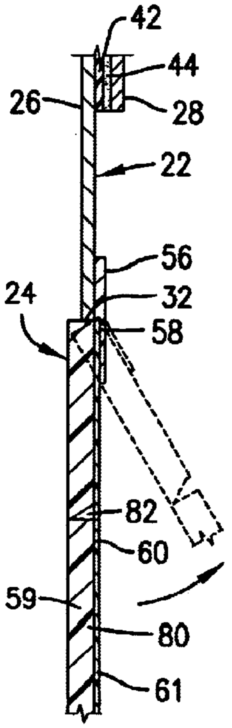
FIG. 5 is an enlarged, fragmentary vertical cross-sectional view taken along line 2—2 of FIG. 1 and similar to FIG. 2, showing a fourth alternative attachment of the carrier component and the magnetic component of the form of FIG. 1, wherein the carrier component and the magnetic component abut one another along their adjacent margins and are connected together by a strip of tape provided with adhesive whereby the magnetic component is hinged to the carrier component, the line of weakness for separating the card from the surrounding magnetic material being provided by a score line.

In greater detail, the sheet 26 has external margins including a top margin 30, bottom margin 32, and side margins 34 and 36, and has a front side 38 and a rear side 40 and is preferably provided in thickness ranging from about 3 mils to about 8 mils. The paper sheet 26 may be provided with a silicone release coating 42 along a portion of its front side 38 in order to receive labels 28 with a coating of adhesive 44 applied on the back side of the labels 28. Alternatively, the labels may be provided with a full coating of an low adhesion adhesive or a pattern coating of adhesive 44 with the silicone release coating 42 omitted to control release during manufacture. The sheet 26 may be alternatively connected to the magnetic component 24 as variously illustrated by FIGS. 2, 3, 4 and 5. As shown in FIG. 2, the magnetic sheet component 24 is attached by a lap joint in overlapping relationship to the paper sheet 26 in an overlap area 46 by adhesive 44. FIG. 3 illustrates an alternative connection to reduce the total thickness of the form 20 and improve feeding of the magnetic component 24 when the form 20 passes through a printer. In FIG. 3, the magnetic component 24 has a top edge 48 which includes a beveled edge 50, and optionally the sheet 26 of the carrier component 22 may have a beveled edge 52 at its bottom margin 32 to increase the area for adhesive connection by adhesive 44. In the alternative connection shown in FIG. 4, the overlap area 46 is provided by a skived area 54 adjacent the top edge 48 of the magnetic sheet component 24 which reduces the thickness of the magnetic sheet component 24 therealong by an thickness approximately equivalent to the thickness of paper sheet 26 and adhesive 44. Thus, where the thickness of the paper sheet 26 is 6 mil. and the thickness of the magnetic sheet component is 10.5 mil., the magnetic sheet component is skived approximately 7 mil. to accommodate the paper and the adhesive 44. FIG. 5 illustrates a further alternative way of attaching the magnetic component 24 to the carrier component 22, wherein the top edge 48 of the magnetic component abuts the bottom margin 32 of the sheet 26 of the carrier component, with a tape strip 56 connecting the top edge 48 and the bottom margin 32 along either the front side 38 or the back side 40 to provide a hinge 58 as illustrated in FIG. 5, thereby facilitating folding of the magnetic component 24 over the carrier component 26 to reduce the overall area of the form 20 for mailing.

The magnetic sheet component 24 is cut from a sheet of flexible magnetic material well known to those skilled in the art, such as the imprintable flexible magnetic sheets manufactured by Magnetic Specialties Incorporated of Marietta, Ohio and available from PWC of Dayton, Ohio, the magnetic sheet component including and identified as a thickness of 10 mil flexible magnetic material 59 with a 2 mil polyester laminate coating 61, the laminate coating 61 being positioned on the front face 60 of the magnetic sheet component. The magnetic sheet component is cut to desired shapes and sizes from stock sheets, which are preferably provided in thicknesses of typically ranging from about 0.010 inches to 0.035 inches and in any event slightly thicker than the carrier thickness. As noted, the magnetic sheet component 24 may be provided in two layers with a synthetic resin such as polyester or vinyl top laminate 61 on its front face 60 for imprinting thereon, and the back face 62 is not necessarily adapted for receiving imprinting thereon. The back face 62 of the magnetic sheet component may also receive printed indicia applied thereto whereby both sides of the form 20 and both sides of the magnetic sheet component may be printed in successive passes through a printer or in a single pass through a duplex printer. The magnetic sheet component 24 is especially magnetically influenced in the present invention, whereby it has been found that a particularly beneficial construction of the aforementioned 10 mil magnetic sheet with 2 mil synthetic resin laminate when used as the magnetic material component is obtained by passing the magnetic sheet component 24 past a magnetic influencer with an air gap of 0.005 to 0.010 inch between the influencer and the magnetic sheet component 24, and thereby creating a magnetic field in the magnetic sheet component with a magnetic density of 14 poles per inch and a resulting field strength of 85 gauss for each pole when measured at a distance of 0.004 inches from the back face 62, 75 gauss when measured at a distance of 0.0065 inches from the back face 62, and 65 gauss when measured at a distance of 0.015 inches when measured from the back face 62. The laminate adhered onto the front face 60 acts as a shield and thus results in a very low and almost undetectable magnetic field strength when measured from the laminate on the front face 60. In addition to top edge 48, the magnetic component includes a bottom edge 64 and side edges 66 and 68. The magnetic component 24 may be further divided by cut lines 70 such as lines of weakness or lines of separation into subparts 72 and 74. As shown in FIG. 1, the magnetic component includes as a line of weakness a score line 76 separating the first and second subparts and a separation line 78 provided as a perforation which defines a magnetic card 80. As an alternative to perforation line as shown in FIGS. 1, 2 and 3, the separation line 78 may be provided as a circumscribing score line 82 may be used to define and permit separation of the magnetic card 80 from the remaining part of second subpart 74 as shown in FIGS. 4 and 5. When perforated magnetic card 80 is thus connected by tabs 84 to the surrounding remainder portion 86 of the second subpart 74, whereby the magnetic card 80 is retained in place during printing but subsequently detachable for separate application to a ferromagnetic surface. The first subpart 72 may be provided with a transfer tape 88 along one of the borders, the transfer tape 88 including a removable release liner 90 having silicone release coating 42 thereon and adhesive 44 which remains on the first subpart 72 of the magnetic component 24 when the release liner 90 is removed. In this way, a sheet or pad of paper may be attached to the adhesive 44 remaining on the first subpart 72 when the first subpart 72 is separated from the second subpart 74 along score line 76 and from the carrier component 22.

In use, the composite form 20 may be provided as cut sheets as shown. The form 20 may be individually fed through a printer, such as a laser or ink-jet printer, to receive indicia such as printing or artwork on the front side of the paper component 22 and also on the front face of the magnetic component 24, even though multiple forms 20 may be stacked in a feed tray of the printer. The form 20 hereof is especially adapted for use in laser and ink jet printers by virtue of the manner in which the magnetic component is coupled to the carrier component, and by the manner of magnetization of the magnetic component. In this way, the indicia may be customized for each intended recipient as it is applied to the paper sheet 26, labels 28, and first subpart 72 and second subpart 74 of the magnetic component 24. The forms 20 thus may be initially printed at the time of production or assembly to include indicia which is generalized for all recipients, and then customized by individualized printing for an individual recipient. After printing, the form 20 may be distributed to a recipient. The composite form 20 has the advantage of allowing a business communication such as an invoice to be included on the paper component 22 along with a useful or promotional item which may be retained by the user, such as a pad holder on the first subpart 72 and a magnetic card 80 detachable from the second component 74. In addition, the provision of removable labels 28 on the sheet 26 permits different labels 28 to be transferred by the user from the paper component 22 onto either the first subpart 72 or a web attached thereto along the adhesive 44 left by transfer tape 88, or to the magnetic card 80, to the remainder of the second subpart 74, or to other substrates.

Figure 6:
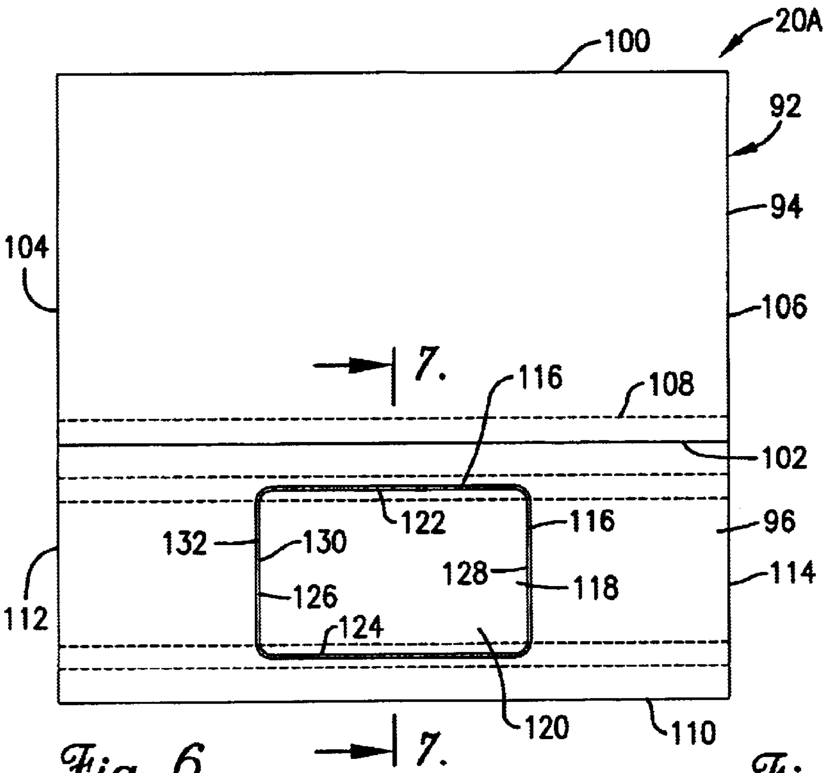
FIG. 6 is a front elevational view of a second embodiment of a composite form in accordance with the present invention, with the magnetic component provided as a rectangular card received within the margins of the carrier component and secured thereto by adhesive tape.
Figure 7:
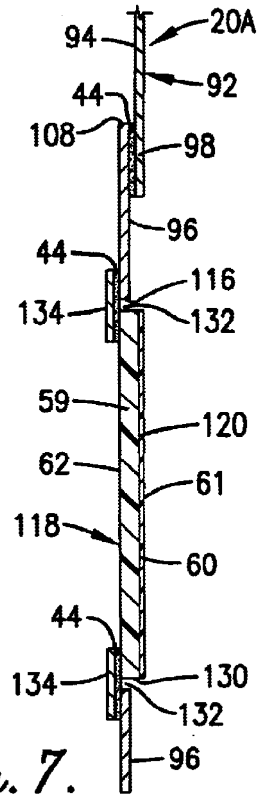
FIG. 7 is an enlarged fragmentary vertical cross-sectional view taken along line 7—7 of FIG. 6 showing the carrier component as two overlapping sheets and the positioning of the magnetic component inlaid into one of the sheets.

A second embodiment of the composite form 20A is shown in FIGS. 6 and 7, wherein like numbers are used to indicate like features to the embodiment shown in FIGS. 1 through 5. Form 20A includes a carrier component 92 provided as a joined web permitting different types or thicknesses of sheets of cardboard, paper, synthetic resin, or foil, or combinations thereof, to be utilized in either a first carrier section 94 and/or a second carrier section 96. The first carrier section 94 is connected to the second carrier section 96 along overlap area 98 by adhesive 44. The first carrier section includes a top margin 100, a bottom margin 102, and side margins 104 and 106, while the second carrier section 96 includes a top border 108, bottom border 110, and side borders 112 and 114 which are preferably co-extensive with respective side margins 104 and 106. The second carrier section 96 has a separation line 78 provided as a die cut to provide an opening 116 die cut therein and positioned entirely interiorly of the borders 108, 110, 112 and 114 of the second carrier section 96.

The form 20A also includes a magnetic component 118 provided of magnetic sheet material as described above and cut to a desired shape, such as a card which is preferably complemental to the shape of the opening 116. The magnetic component 118 is shown as a rectangular magnetic card 120 having a top edge 122, a bottom edge 124, and side edges 126 and 128 is shown, but it may be appreciated that the magnetic component can be cut to any desired shape. The magnetic card 120 thus has a periphery 130 provided by the edges 122, 124, 126 and 128 which is preferably only slightly smaller in dimensions than that of the opening 116 so that a narrow gap 132, shown exaggerated in the drawings, is provided between the magnetic card 120 and the surrounding portion of the second carrier section 96 of the carrier component 92, the magnetic card 120 thus being inlaid into the opening as illustrated in FIGS. 6 and 7. Tape 134, preferably of thin film such as b 1or 2 mil thickness synthetic resin provided with adhesive 44, spans the gap 132 along the top edge 122 and the bottom border 124 so as to interconnect the magnetic card 120 with the first carrier section 94. The adhesive 44 holds the magnetic card 120 in position during printing and transmittal by mail or the like, but remains on the tape 134 when the card 120 is removed from the second carrier section 96. Form 20A may be provided as either a cut sheet or as a separable form in a continuous web. When provided as a continuous web, the side margins 104 and 106 and side borders margin 112 and 114 are defined by lines of weakening such as perforations with additional forms 20A removably attached thereto by the tabs of the perforations which pass through not only the carrier component 92 but also the tape 134. It may be appreciated that the second carrier section 96 may be provided with several openings 116, each provided with a magnetic card 120 inlaid therein, as illustrated in FIG. 1.

Figure 8:
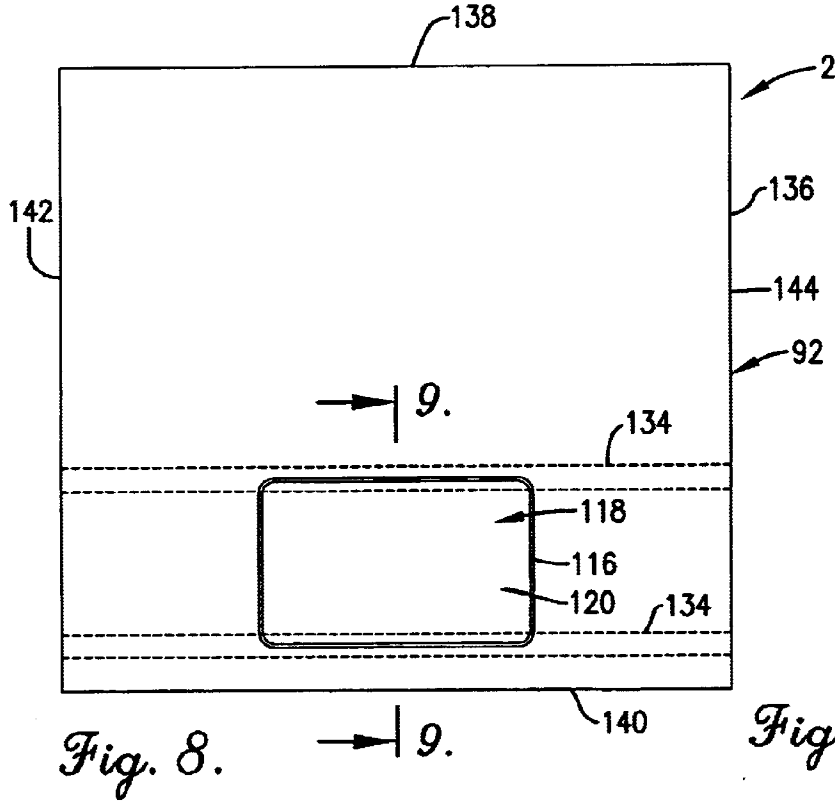
FIG. 8 is a front elevational view of a third embodiment of a composite form in accordance with the present invention, wherein the carrier component is provided as a single sheet with the magnetic card inlaid therein.
Figure 9:
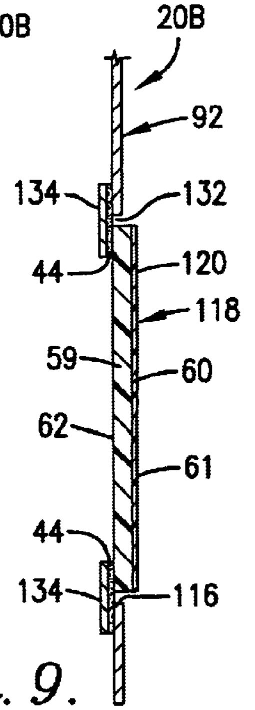
FIG. 9 is an enlarged fragmentary vertical cross-sectional view taken along line 9—9 of FIG. 8 showing the magnetic card inlaid into the carrier component and secured thereto by adhesive tape.

A form 20B as shown in FIGS. 8 and 9 is similar to form 20A, with like numbers used to indicate the same features. The carrier component 92 is provided of a unitary sheet 136 of paper, cardboard, synthetic resin or foil, rather than as two joined sections. The sheet 136 thus has a top margin 138, a bottom margin 140, side margins 142 and 144, and an opening 116 located interiorly of the surrounding margins. The opening 116 receives the inlaid magnetic component 118 which is shown as a rectangular card 120 of magnetic sheet material as described above. The shape of the opening 116 and the complementally shaped card 120 may be altered from a rectangular shape as noted above, with examples of such shapes including a star shape, pentagon, or arcuate shape as desired. Tape 134 temporarily secures the card 120 within the opening 116 and the adhesive thereon remains with the tape and does not transfer to the magnetic card 120 when it is removed from the form 20B. The tape 134 is provided as two strips which extend across portions of the gap 132 between the magnetic card 120 and the carrier component, and as shown for the rectangular card 120, extends along the top edge 122 and the bottom edge 124 to hold the magnetic card in an inlaid position within the opening 116, thereby aiding feeding of the form 20B through a printer. The attachment of the tape strips along the borders 114 and 116 leaves the front face 60 of the magnetic card fully available for printing as well as providing a large open area on the back face 62 of the magnetic card 120 in the event double sided printing of the form including both the paper component and the magnetic sheet component is desired.

Figure 10:
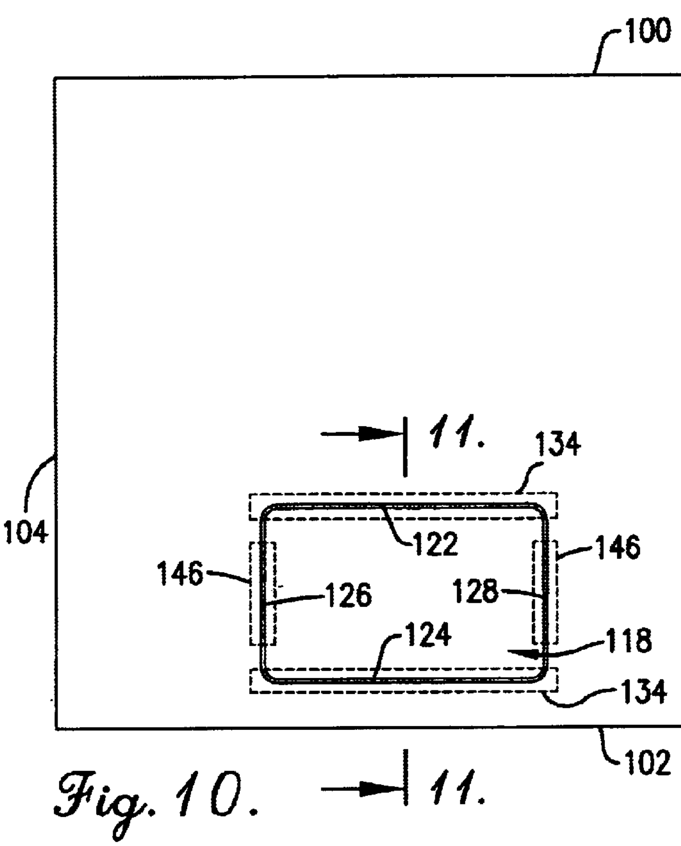
FIG. 10 is a front elevational view of a fourth embodiment of a composite form of the present invention similar to FIG. 8 but wherein the magnetic component is secured to the carrier component by intermittent tape patches applied to span across the circumscribing gap between the side borders of the magnetic component and the surrounding carrier component as well as elongated tape strips spanning across the gap along top and bottom borders of the magnetic component.
Figure 11:
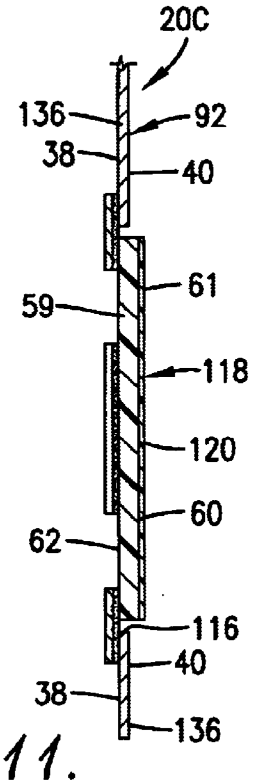
FIG. 11 is an enlarged vertical cross-sectional view taken along line 11—11 of FIG. 10 showing the inlaid magnetic component attached by the tape strips and patches to the carrier component.

A further form 20C is shown in FIGS. 10 and 11 and is in all respects similar to the form 20B with like numbers used to indicate like features except that in addition to the elongated tape strips 124, tape patches 146 preferably of thin film adhesively backed tape are applied across the gap 132 at the side edges 126 and 128. The tape patches 146 may be of different shapes, but as shown in FIGS. 10 and 11, have their longitudinal axes oriented perpendicular to the longitudinal axes of the tape strips 134. As with form 20B, form 20C may be provided as either cut sheets or as a continuous series of forms separated by transversely extending perforations along the side margins 142 and 144, the continuous web thus providing several interconnected 30 forms positioned side-by-side as illustrated in FIGS. 10 and 11. The attachment of the tape strips 134 along the top and bottom edges 122 and 124 and the tape patches 146 along the side edges 126 and 128 leaves a large open area on the rear face 62 of the magnetic card 120 in the event double sided printing is desired.

Figure 12:
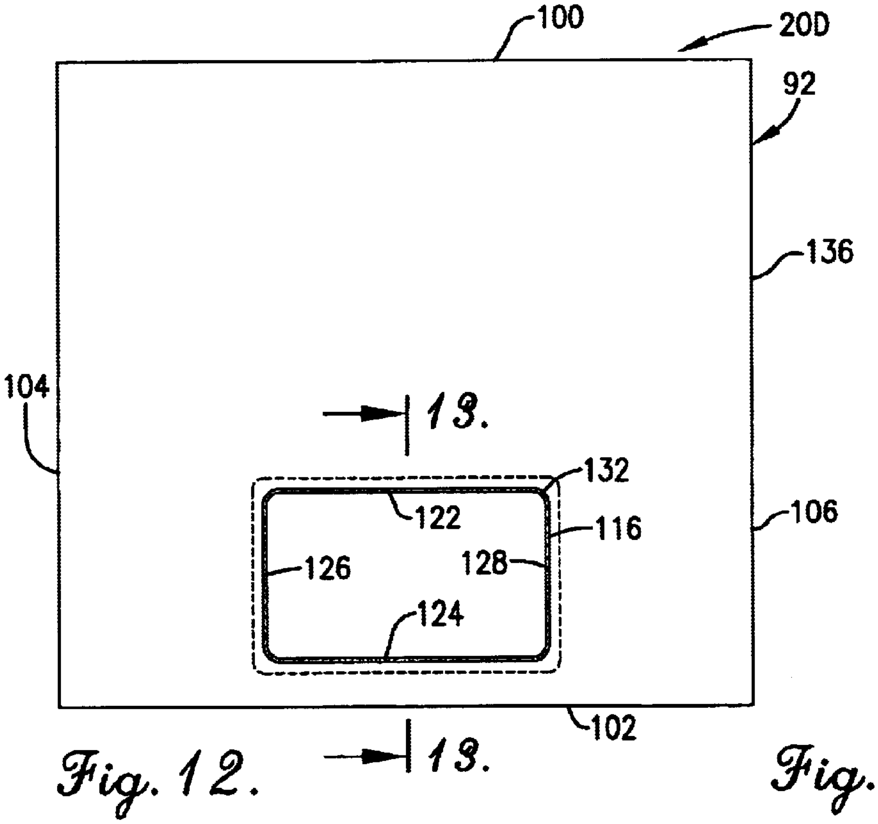
FIG. 12 is a front elevational view of a fifth embodiment of the composite form of the present invention similar to that shown in FIG. 10 but wherein a patch extends across the back side of the magnetic component in spanning relationship across the circumscribing gap surrounding the magnetic component to connect the magnetic component to the carrier component.
Figure 13:
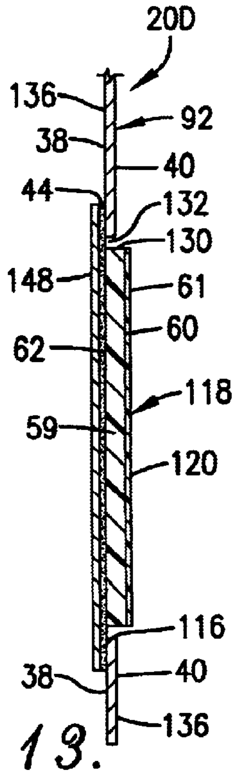
FIG. 13 is an enlarged vertical cross-sectional view taken along line 13—13 of FIG. 12 showing the placement of the patch and adhesive adjacent the back side of the magnetic component and connected to both the carrier component and the magnetic component.

An additional alternative construction is provided by form 20D as shown in FIGS. 12 and 13. Form 20D is similar to form 20C but differs in that a full-size adhesive patch 148 covers the back side of the opening 116 and extends onto the rear side 40 of the sheet 126 completely around and across the gap 132, whereby the inlaid magnetic card 120 has a rear face 62 which is secured by the adhesive 44 on the patch 148 to hold the magnetic card 120 in position. The patch 148 is preferably of a thin film with adhesive backing. After printing, the card is peeled off of the patch 148 with the adhesive remaining attached to the patch and not transferring to the magnetic card 112. This arrangement may be used where it is desired to print indicia on either the front side or the back side of the patch 148 or where a more aggressive adhesive connection is desired to hold the magnetic card 120 in position for high speed printing where the form 20D passes over a number of rollers or the like which tend to separate the magnetic card 120 from the carrier component 22.

Figure 14:
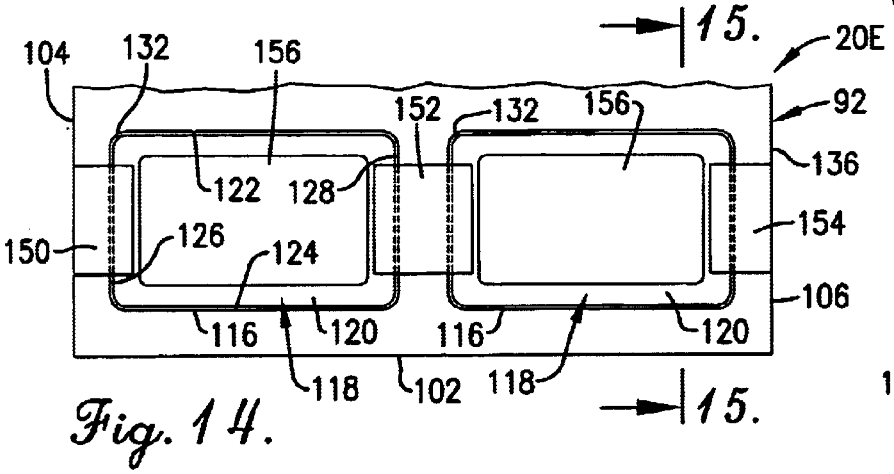
FIG. 14 is fragmentary rear elevational view of a sixth embodiment of the composite form of the present invention similar to that shown in FIG. 6, wherein the magnetic cards are inlaid into the carrier component and provided with an adhesive backing overlaid by a release sheet, the magnetic cards being coupled to the surrounding carrier component by intermittently applied adhesive tape spanning the gap between the side edges of the magnetic cards and the carrier component.
Figure 15:
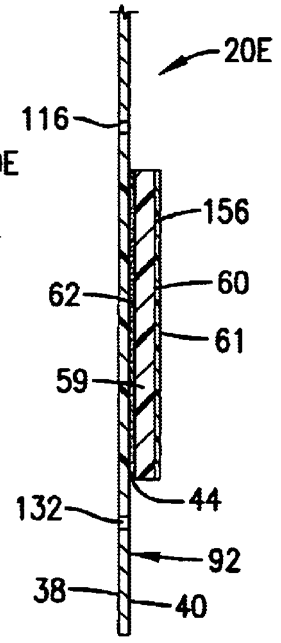
FIG. 15 is an enlarged vertical cross-sectional view taken along line 15 . 15 of FIG. 14 showing the release sheet and adhesive layer along a portion of the back side of one of the magnetic cards.
Figure 16:
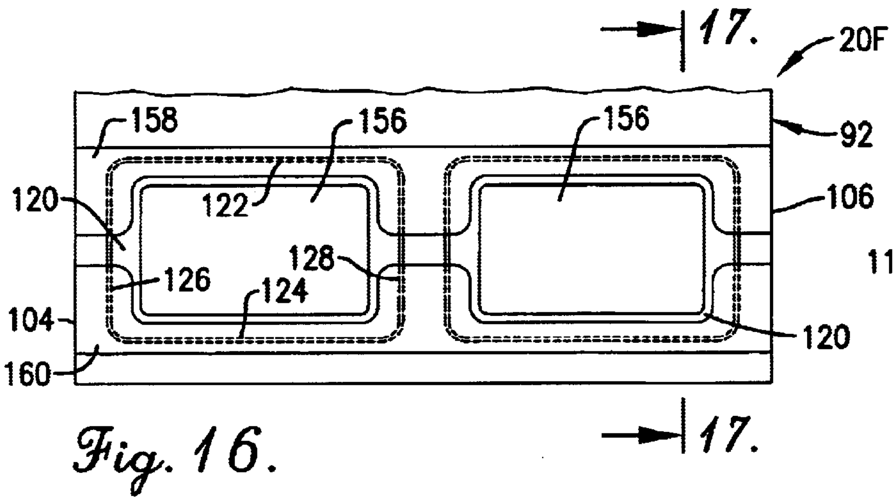
FIG. 16 is a fragmentary rear elevational view of a seventh embodiment of the composite form of the present invention similar to that shown in FIG. 14, wherein the magnetic cards are inlaid into the carrier component and coupled thereto by upper and lower tape strips arranged along the top and bottom borders of the magnetic cards and extending convergently along a portion of the side borders of the magnetic cards to span a portion of the gap between the side borders and the adjacent carrier component.
Figure 17:
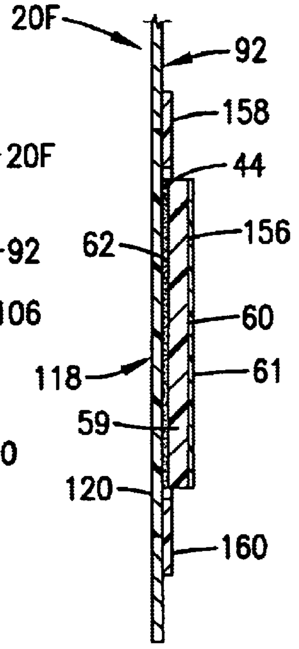
FIG. 17 is an enlarged vertical cross-sectional view taken along line 17—17 of FIG. 16 showing the release sheet and adhesive layer along a portion of the back side of one of the magnetic cards.

A further alternative embodiment of the invention hereof is provided by form 20E as shown in FIGS. 14 and 15. Form 20E is similar to forms 20A, 20B, 20C and 20D with like numbers used to show like features, and is shown having a plurality of openings 116 which, as described above, may be provided to each receive a magnetic component 118 such as a magnetic card 120. The magnetic cards 120 as shown in FIGS. 14 and 15 are also of a slightly smaller overall area than the area of the openings 116 so that the magnetic card 120 is inlaid into the openings 116. The cards 120 are held to the sheet 136 of the carrier component 22 by intermittently placed tape patches 150, 152 and 154 which span the gap 132 along the side edges 126 and 128 of the magnetic cards 120. In addition, a portion of the rear face 62 of the magnetic cards 120 is provided with adhesive 44, such as pressure sensitive adhesive, and a silicone release liner 156. The provision of the adhesive 44 permits the cards 120 to receive thereon a further member such as a sheet of paper or business card so that the magnetic card 120 can magnetically attach to a ferromagnetic material as a substrate and then adhesively couple to the member. The embodiment shown as form 20F of FIGS. 16 and 17 is similar to form 20E, but uses contoured adhesive tapes 158 and 160 preferably of synthetic resin film provided with adhesive 44 as described above with respect to tape 134 to hold the inlaid magnetic cards 120 in position. The contoured tapes 158 and 160 each includes a plurality of lobes 162 which alternate with and extend in convergency from relatively narrow bands 164. The bands 164 extend longitudinally along the top and bottom edges 122 and 124 of the magnetic card 120 while the lobes 162 extend over the corners 166 of the magnetic card 120 and along a portion, but not all, of the side edges 126 and 128. Because the openings 116 and thus the magnetic cards 120 are aligned horizontally across the form 20E, the tapes 158 and 160 may secure both cards 120 to the carrier component 22, without extending substantially across the rear face 62 of the magnetic cards 120. This, in turn, permits either a relatively large area for printing on the rear face 62, or as shown in FIGS. 16 and 17, the use of adhesive 44 and a silicone release liner as describe with respect to form 20E above.

In each of the embodiments 20A through 20F described herein, a card of flexible magnetic sheet material is carried within a non-magnetic carrier component of the form extending the full length and width of the form. In this way, a small and separable flexible magnet article in a shape such as that of a card can be carried through a laser or ink jet printer and imprinted, either alone or with other usable parts of the composite form, without the card overlying the paper component on which it is carried.

Figure 18:
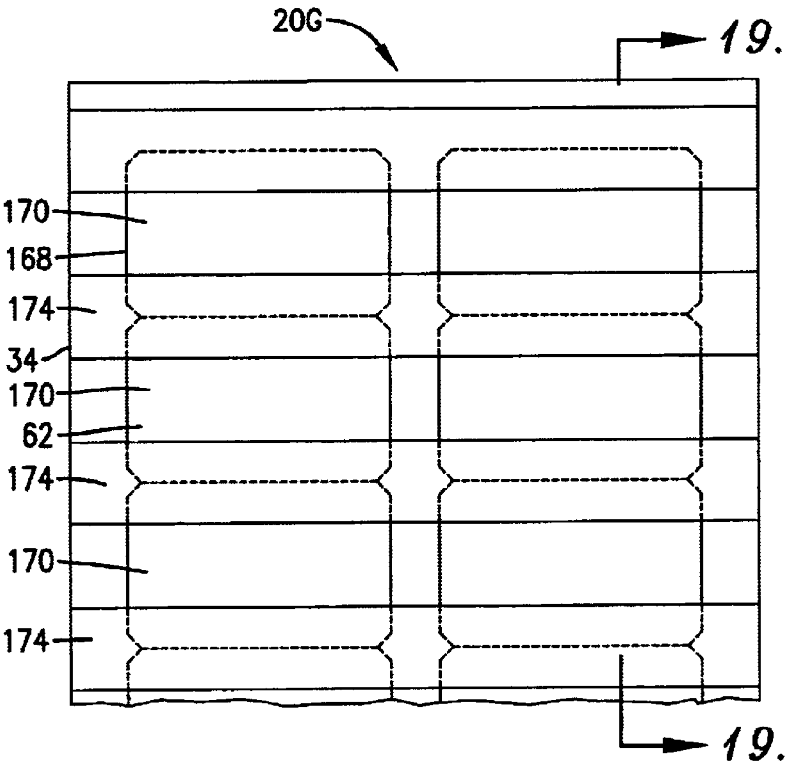
FIG. 18 is a fragmentary rear elevational view of an eighth embodiment of the composite form of the present invention, wherein the carrier component and the magnetic component are layered and connected by adhesive, and a plurality of magnetic cards are die cut into the magnetic component and positioned in adjacency along columns, with the magnetic cards coupled to the surrounding portion of the magnetic component by elongated tape strips.
Figure 19:
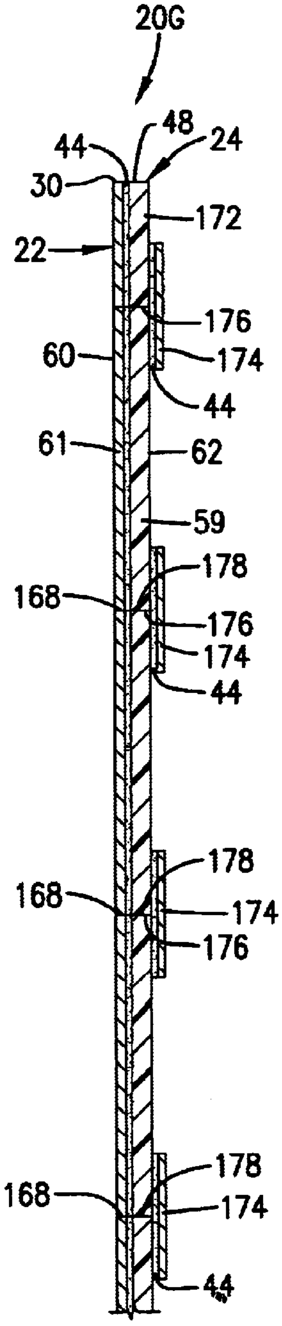
FIG. 19 is an enlarged vertical cross-sectional view taken along line 19—19 of FIG. 18 showing the tap strips adhesively connecting the magnetic cards to adjacent cards and to the surrounding portion of the magnetic component.

A further alternative embodiment of the invention hereof is shown as form 20G in FIGS. 18 and 19. Form 20G includes a carrier component 22 which is preferably paper or synthetic resin and laminated onto the front face 60 of the magnetic component 24 thereby providing a layer or surface which may be readily imprinted and also shields the magnetic field. Adhesive 44 is provided between the carrier component 22 and the magnetic component 24, and the carrier component can be provided with a silicone release coating on its rear side 40 receiving the adhesive thereon if desired in order to permit removal of the carrier component 22 to expose the adhesive. The magnetic component 24 and the carrier component 22 are die cut along cut lines 168 which provide beveled corners for cards 170 which include both the carrier component and the magnetic component. As shown in FIGS. 18 and 19, a plurality of cards 170 may be positioned in adjacency in columns. The cards 170 are secured to the remainder 172 of the magnetic component 24 by adhesive 44 on elongated tape strips 174 extending along two parallel edges 176 and 178 of the cards 170. The cards 170 may be printed with indicia on their front face 60 prior to the application of adhesive. Indicia may also be printed on the rear face 62 between the tape strips 174, and additionally, indicia may be applied on the front side 38 of the carrier component, either when the form 20G is assembled or individually by, for example, a desktop printer such as a laser printer or an ink jet printer to print customized indicia on the cards 170. The cards 170 may be individually removed from the remainder 172 and applied to a ferromagnetic surface. One use for such a construction may be to receive business cards thereon as a promotional item, and another may be for temporarily identifying parts for assembly, whereby the cards 170 may be used as tags and removably attached to the parts.

Advantageously, each of the forms 20 through 20G hereof may be fed through a laser or ink jet printer to permit custom imprinting of both the carrier component and the magnetic component, in that the magnetization of the magnetic sheet component is sufficient to permit magnetic attachment to a ferromagnetic substrate without be so strong as to inhibit multiple sheet feeding through the printer. That is to say, multiple forms 20, 20A, 20B, 20C, 20D, 20E, 20F, and 20G may be stacked for feeding into the printer one atop another, but each form will be individually fed into the printer without carrying another similar form with the magnetic component with it. Printing of the carrier component and the magnetic component may be accomplished in a single pass on one-sided printers on forms 20 through 20F, and rear face 62 between the tape strips 174. All of the forms 20 through 20G and on duplex printers for all of forms 20 through 20G. Additionally, the forms 20 through 20G may be fully or partially preprinted on a high speed continuous printing press without separation of the magnetic component from the paper component, thereby providing an improved mechanism of delivery of the magnetic material as part of a composite form.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the doctrine of Equivalents to determine and assess the reasonably fair scope of their invention as pertains to any apparatus not materially departing from but outside the literal scope of the invention as set out in the following claims.

What is claimed is:

1. A composite form comprising;

a carrier component including a non-ferromagnetic sheet having a thickness and a top margin, a bottom margin, and a pair of side margins, a front side and a back side, said carrier component includes an opening therein positioned interior to said top margin, bottom margin and side margins; and a magnetic sheet component consisting of magnetically influenced flexible magnetic material having a front face, a back face and an edge, and a shielding layer applied over at least one of said front and back faces and a full thickness greater than the thickness of said carrier component and adhesively connected to said non-ferromagnetic sheet alone at least the edge of said magnetic sheet component, said magnetic sheet component including a portion thereof separable from said carrier along a separation line, and said magnetic sheet component is inlaid within said opening and a portion of said magnetic component extending beyond one of said front and back sides of said carrier component when said magnetic sheet component is within said opening.

2. A composite form as set forth in claim 1, wherein said carrier component includes at least one label provided with adhesive and releasably mounted to said carrier sheet.

3. A composite form as set forth in claim 1, wherein said carrier component is provided as a single sheet having an opening therein interior to said top margin, bottom margin and side margins and said magnetic sheet component is provided as a card complementally shaped to said opening and inlaid in said opening.

4. A composite form as set forth in claim 1, wherein the magnetic sheet component has a magnetic field density of about 14 poles per inch and a magnetic strength of about 85 gauss per pole at a distance of about 0.004 inches from the magnetic sheet component.

5. A composite form as set forth in claim 1, wherein said magnetic sheet component is divided by a line of weakening into a first subpart and a second subpart separable from each other along said line of weakening.

6. A composite form as set forth in claim 5, wherein one of said first and second subparts of said magnetic sheet component further includes a top edge, a bottom edge and a pair of side edges and a second line of weakening spaced interiorly of said edges and said spaced from said first line of weakening to define a card within one of said subparts and detachable from a remainder of one of said subparts.

7. A composite form as set forth in claim 1, wherein said carrier component sheet extends beyond the edge of said magnetic sheet component.

8. A composite form as set forth in claim 7, wherein said magnetic sheet component is mounted to said carrier component sheet without the full thickness of said magnetic sheet component overlying the carrier component.

9. A composite form as set forth in claim 8, wherein said magnetic sheet component includes at least one beveled edge which is adhesively connected to one of the margins of said carrier component.

10. A composite form as set forth in claim 8, wherein said magnetic sheet component includes a skived area extending along the edge to create an area of reduced thickness relative to the full thickness of the magnetic sheet material, said carrier component is adhesively attached to said magnetic sheet component along said skived area.

11. A composite form as set forth in claim 1, wherein said magnetic sheet component is complementally configured to the shape of the opening.

12. A composite form as set forth in claim 11 wherein said edge of said magnetic sheet component includes a top edge, a bottom edge and a pair of spaced-apart side edges defining a gap between said magnetic sheet component and said carrier component into which it is inlaid, and wherein said magnetic sheet component is adhesively secured to said carrier component sheet by at least a first tape strip and a second tape strip extending substantially parallel to one another along the top and bottom edges in spanning relationship across portions of said gap.

13. A composite form as set forth in claim 12 wherein said tape strips are attached to the back side of said carrier component.

14. A composite form as set forth in claim 12 wherein at least said one of said first and second tape strips includes a lobe portion which extends convergently toward the other of said first and second tape strips and along one of the side edges of the magnetic sheet component in spanning relationship across a part of said gap.

15. A composite form as set forth in claim 11, wherein a gap is presented between said magnetic sheet component and said carrier component, including a pair of longitudinally spaced and aligned patches attached in spanning relationship to respective parts of the gap and adhesively attaching the side edges of said magnetic sheet component to said carrier component.

16. A composite form as set forth in claim 15, wherein said patches are attached to the back side of said paper sheet.

17. A composite form as set forth in claim 1, wherein the magnetic sheet component is magnetized so as to be able to adhere to a ferromagnetic substrate and the magnetic sheet component does not adhere to a distinct composite form with a magnetic component in a stacked configuration.

18. A composite form as set forth in claim 17, wherein the magnetic sheet component is magnetized with 14 magnetic poles per inch.

19. A composite form as set forth in claim 18 wherein the shielding layer of the magnetic sheet component is a synthetic resin layer coupled to the front face.

20. A stack of composite forms comprising:

multiple adjacent composite forms wherein each composite form comprises:

a carrier component including a non-ferromagnetic sheet and an opening provide therein; and a magnetic sheet component consisting of magnetically influenced flexible magnetic material having a front face, a back face, and an edge, wherein at least one of said front and back faces comprises a shielding layer whereby said shielding layer prevents the magnetic sheet from adhering to an adjacent composite form with a magnetic component in a stacked configuration, said magnetic sheet is disposed within said opening of the carrier component and is adhesively attached to said carrier component along at least the edge of said magnetic sheet component, the magnetic sheet component being magnetized so as to be able to adhere to a ferromagnetic substrate.

21. A composite form as set forth in claim 20, wherein the carrier component has an external margin and an opening spaced from and interior thereto and wherein the magnetic sheet component is received within and complementally shaped to the opening.

22. A composite form as set forth in claim 20, wherein the carrier component includes an external margin and the magnetic sheet component is adhered to the carrier component along the external margin of the carrier component.

23. A composite form as set forth in claim 20, wherein the carrier component is in overlying relationship to the magnetic sheet component.

24. A composite form as set forth in claim 20, wherein the magnetic sheet component is magnetized having a magnetic field density of about 14 poles per inch and a magnetic strength of about 85 gauss per pole at a distance of about 0.004 inches from the back face of the magnetic sheet component.

25. A composite form as set forth in claim 24, wherein the magnetic sheet component includes a synthetic resin laminate coupled to the front face.

* * * * *